BEST AVAILABLE COPY

W. S. TORRENCE.
STEERING WHEEL.
APPLICATION FILED JUNE 14, 1915.

1,176,500.

Patented Mar. 21, 1916.
2 SHEETS—SHEET 1.

Witness:

Inventor
Walter S. Torrence
by Bauning & Bauning
Att'ys

W. S. TORRENCE.
STEERING WHEEL.
APPLICATION FILED JUNE 14, 1915.

1,176,500.

Patented Mar. 21, 1916.
2 SHEETS—SHEET 2.

Witness:
Wm. P. Bond

Inventor
Walter S. Torrence
by Rainey & Rainey
Attys

UNITED STATES PATENT OFFICE.

WALTER S. TORRENCE, OF NEW YORK, N. Y.

STEERING-WHEEL.

1,176,500.	Specification of Letters Patent.	Patented Mar. 21, 1916.

Application filed June 14, 1915. Serial No. 34,076.

*To all whom it may concern:*

Be it known that I, WALTER S. TORRENCE, a citizen of the United States, residing at New York, in the county and State of New York, have invented certain new and useful Improvements in Steering-Wheels and the like, of which the following is a specification.

The present invention has reference to improvements in steering wheels.

The features herein disclosed have reference particularly to that type of steering wheel in which means is provided for throwing the steering wheel out of commission when desired so as to prevent it from functioning in the normal manner. Wheels of this class or type are of general application in automobile and truck service, but the features of the invention are in no wise limited to such vehicles.

The main object of the invention is to interlock the wheel control device in such a way that, when the steering wheel is thrown out of commission, the ignition circuit of the engine will be simultaneously interrupted or modified so as to prevent the proper firing of the engine cylinders. By means of this interconnection, assurance will be had that, whenever the steering wheel itself is thrown out of commission, the operation of the engine will be simultaneously interrupted so as to obviate any danger of starting or running the engine at such times.

Another feature of the invention has reference to the construction of the steering wheel lock itself. This feature of the invention has for its main object the improvement of the mechanical construction of this lock so as to simplify the lock, and at the same time improve its mechanical and operating features.

Other objects and uses of the invention will appear from a detailed description of the same which consists in the features of construction and combinations of parts hereinafter described and claimed.

Figure 1:
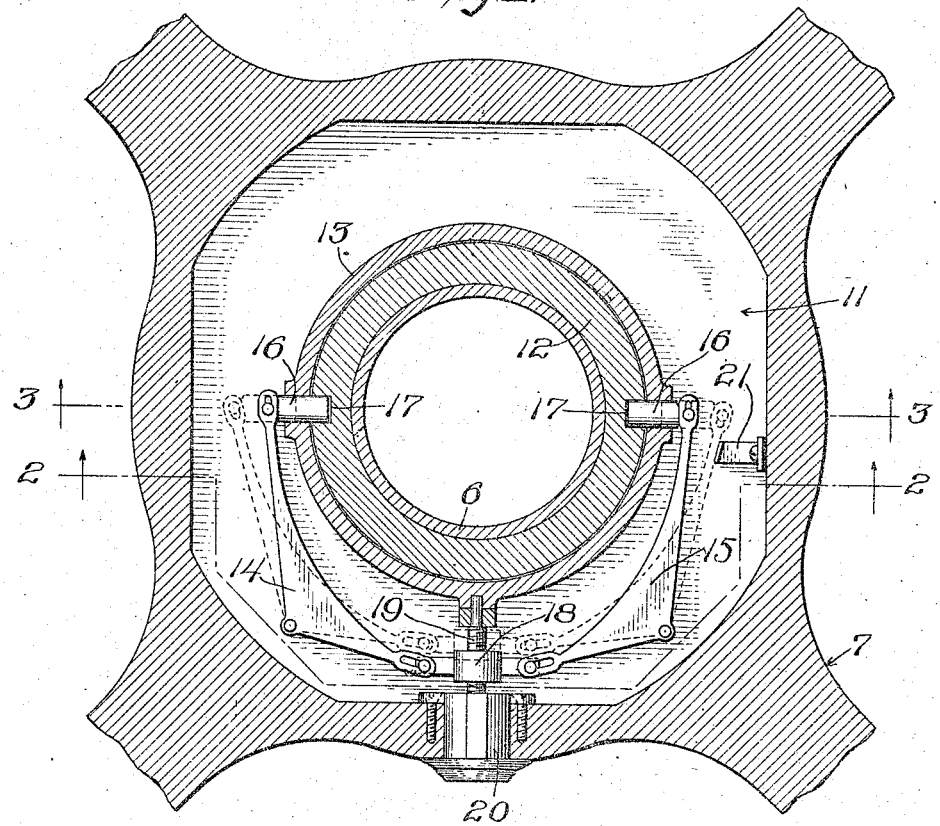
Figure 2:
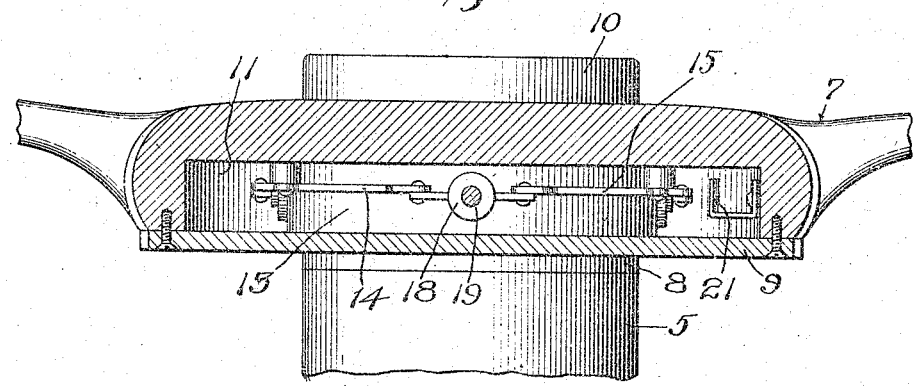
Figure 3:
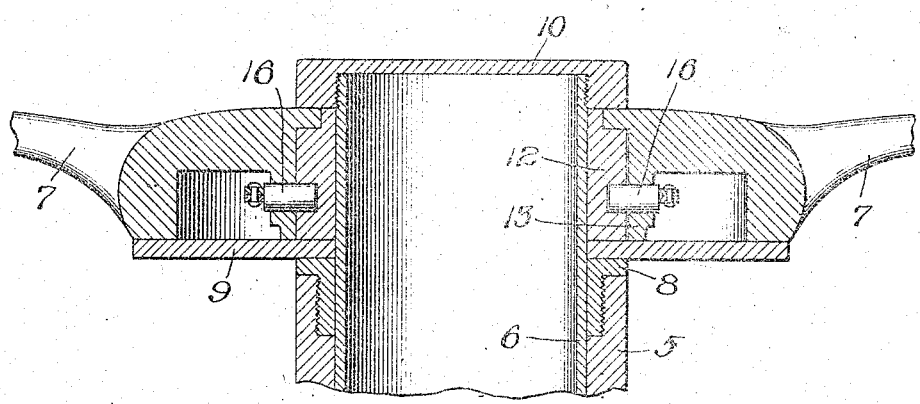
Figure 4:
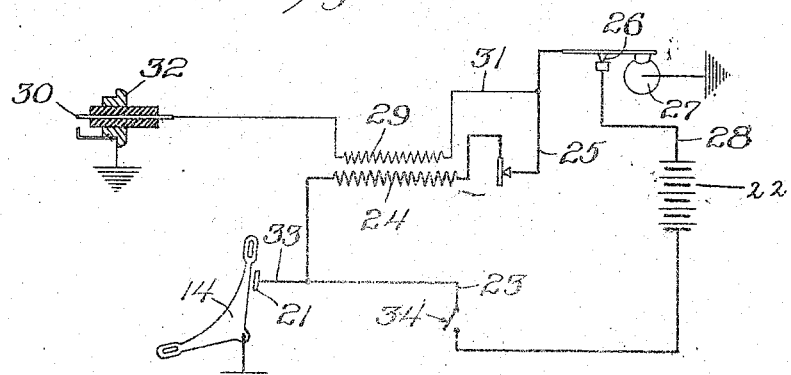

In the drawings: Figure 1 shows a horizontal section through a steering wheel and associated parts having applied thereto the features of the present invention; Fig. 2 is a vertical section taken on line 2—2 of Fig. 1, looking in the direction of the arrows; Fig. 3 is a vertical section taken on line 3—3 of Fig. 1, looking in the direction of the arrows; and Fig. 4 is a wiring diagram, showing a typical set of electrical connections for the ignition circuit, having applied thereto the features of the present invention.

In the several figures, the numeral 5 designates the post within which is rotatably mounted the tubular steering rod 6. This tubular rod 6 runs down through the stationary post 5, and connects in a suitable manner to the steering wheels of the vehicle. Upon rotating the tube 6, the direction of the steering wheels is adjusted one way or the other. The steering wheel 7 is rotatably mounted with respect to the post 5. As a convenient form of construction, the cap 8 on the upper end of the post directly supports the bottom plate 9 of the steering wheel. A cover cap 10, screw-threaded onto the upper end of the post 6, maintains the steering wheel in position on the post 5, but the steering wheel is free to rotate with respect to the post 6 and cap 10 when the locking device is thrown into disconnected position. The central portion of the steering post is hollow, being provided with a chamber 11. Within this chamber are mounted the locking mechanisms. A sleeve 12 is brazed or otherwise secured to the steering post 6, and a flange 13 on the steering wheel is free to turn with respect to said sleeve. When the flange is locked to the sleeve, the rotation of the steering wheel will simultaneously rotate the steering post 6. Within the chamber 11 are pivoted the bell cranks 14 and 15. The outer ends of these bell cranks are connected to the pins 16 which slide within the flange 13, and which are adapted to engage with the sockets 17 of the sleeve 12. When so engaged, the steering wheel is locked to the steering post. On the other hand, when the bell cranks are rocked into the dotted line position, the pins 16 are withdrawn from the sockets 17, and the steering wheel is thereupon disconnected from the steering post. The inner ends of the bell cranks are operatively connected to a collar 18 which is threaded onto the pin 19. Rotation of said pin carries the collar in the one direction or the other, to rock the bell cranks. A lock 20 of any desired construction is provided for controlling the rotation of the pin 19, so that, when a key is inserted in said lock, and is rotated, the pin will also be rotated in the desired direction.

Within the chamber 11, I mount an electrical contact 21 which will be engaged by one of the arms 14 when said arm is swung out a sufficient distance to disengage its pin 16 from the corresponding socket 17. This contact is so connected into the electric circuit that when it is engaged by the arm 14 which is grounded or otherwise connected to the electric circuit, said circuit will be disabled for sparking purposes. In Fig. 4, I have illustrated one set of electrical connections, by means of which this feature of the invention may be carried into effect. The battery is designated by the numeral 22. It supplies current through the wire 23 to one end of the primary coil 24, and from the other end of said coil, the wire 25 establishes connection to the timing device 26. This timing device is actuated by rotation of the cam 27 as the engine rotates. The wire 28 connects the other side of the timing device 26 to the battery. The secondary coil 29 has one end connected to the point 30 of the spark plug, and has its other end connected to the wire 25 by means of the wire 31. The sleeve 32 of the spark plug is grounded, and the cam 27 is also grounded. Therefore, the return circuit of the high tension system is through the frame of the engine. The grounding of the cam also grounds one side of the battery. The contact 21 connects to the wire 23 by means of the wire 33, and inasmuch as the bell crank 14 is grounded, it follows that the wire 23 will be connected to ground when the bell crank is thrown out into disengaged position. Thereupon the battery will be short-circuited, or at any rate rendered inoperative. A switch 34 serves to open the primary circuit when desired.

While I have herein shown and described only a single embodiment of my invention, still I do not limit myself to the same, except as I may do so in the claims, but I contemplate within the scope of my invention, any equivalent structures operating in equivalent manners to produce equivalent results.

I claim:

1. The combination with the ignition circuit and steering device of a self-propelled vehicle, of a steering wheel independent of the steering device, there being a central chamber in said wheel, a pair of bell cranks pivotally mounted in said chamber, a pair of locking pins slidably mounted with respect to the steering wheel and adapted to engage the steering device when they are moved inwardly, operative connections from the outer arms of the bell crank to said pins, a threaded pin mounted in the steering wheel and extending into said chamber, a collar threaded onto said pin, an operative connection from the collar to the inner arm of each bell crank, and an electrical contact constituting a portion of the ignition circuit mounted within said chamber in position for engagement by one of the bell cranks when the same is thrown into position to disengage its pin from the steering device, to thereby render inoperative the ignition circuit.

2. The combination with the steering device and ignition circuit of a self-propelled vehicle, of a steering wheel, there being a central chamber in said wheel, locking pins carried by the steering wheel and movable into position to engage the steering device for the purpose of locking the steering wheel thereto, bell cranks pivotally mounted within said chamber, operative connections from the outer arms of the bell cranks to the pins, means for actuating the inner arms of the bell cranks, and an electrical contact mounted within said chamber and constituting a portion of the ignition circuit, said contact being mounted in position to be engaged by one of the bell cranks when the same is thrown into inoperative position for the purpose of thereby rendering the ignition circuit inoperative.

3. The combination with the steering device and ignition circuit of a self-propelled vehicle, of a steering wheel, there being a hollow chamber in the steering wheel, a locking pin slidably mounted in the steering wheel in position to at times engage the steering device, a bell crank pivotally mounted within the chamber, an operative connection from the outer arm of the bell crank to said pin, means for actuating the inner arm of the bell crank for the purpose of controlling the position of the pin, and an electric contact constituting a portion of the ignition circuit mounted within the chamber in position to be engaged by the bell crank when the same is thrown into such position as to withdraw the pin from locking engagement with the steering device, to thereby render inoperative the ignition circuit.

4. The combination with the steering device and ignition circuit of a self-propelled vehicle, of a steering wheel, a locking device carried by the same and adapted to at times engage the steering device for the purpose of locking the steering wheel thereto, actuating means for operating said locking device, and an electrical contact constituting a portion of the ignition circuit and adapted to be engaged by said actuating means when the locking device is disengaged from the steering wheel to thereby render inoperative the ignition circuit at such time.

5. The combination with the steering device and ignition circuit of a self-propelled vehicle, of a steering wheel, a locking device carried by said wheel and movable with respect thereto into and out of engagement with the steering device, means for actuating said locking device, and an electrical contact constituting a portion of the ignition circuit and mounted in position to be engaged by the actuating means when the same is actuated to disengage the locking device from the steering device, to thereby render inoperative the ignition circuit at such time, the operation of said contact being independent of the engagement of the locking device with the steering device.

WALTER S. TORRENCE.

Witnesses:
E. W. CLUTE,
R. A. BALDWIN.